Dec. 28, 1948.    J. SANDUSKY    2,457,322
ELECTROLYTE LEVEL CONTROL DEVICE
FOR STORAGE BATTERIES
Filed Aug. 2, 1947

Inventor
Julius Sandusky
by
ATTY.

Patented Dec. 28, 1948

2,457,322

UNITED STATES PATENT OFFICE 2,457,322

ELECTROLYTE LEVEL CONTROL DEVICE FOR STORAGE BATTERIES

Julius Sandusky, Toronto Township, Peel County, Ontario, Canada

Application August 2, 1947, Serial No. 765,681

6 Claims. (Cl. 136—177)

1

This invention relates to an electrolyte level control device for storage batteries, and particularly to the type of device in which the filling up of the filling opening indicates when the battery is filled to the proper level.

In such devices it is necessary to provide an opening sufficiently large to accommodate the hydrometer used for testing the electrolyte. It is also desirable to construct the device so that the electrolyte will provide an audible indication and successive visual indications to the operator that the battery is filled to the required level.

The object of this invention is to devise an improved device which will satisfy the above requirements and which is adapted to be manufactured by mass production methods at a very small cost.

Another object of this invention is to provide a vent construction for the storage battery adapted to prevent squirting due to the expansion of the electrolyte.

According to my invention I provide an electrolyte control device for storage batteries comprising a cell having a filling opening in the top thereof, an outer filling tube mounted in the top of the cell around the filling opening, an inner tube of smaller diameter than the outer tube spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, and a vent aperture communicating between the otherwise closed air space beneath the top of the cell and the well, the aperture being of such size that liquid poured into the well will form a seal when the electrolyte in the cell closes the bottom of the inner tube. I also provide a cap adapted to seal the top of the outer tube, the cap having an opening therein adjacent its outer edge adapted to be positioned above the annular passage on mounting the cap and serving to vent the battery and whereby the inner tube serves as a baffle.

The aforesaid objects are attained by means of the construction hereinafter described and illustrated by way of example in the accompanying drawing in which.

2

Figure 3:
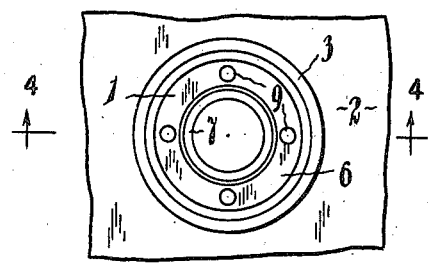
Figure 3 is a plan view of the device, with the cap removed.
Figure 5:
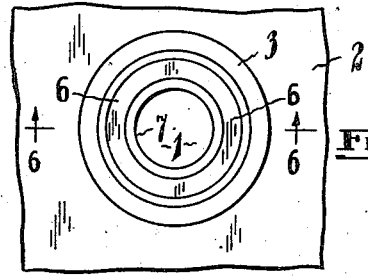
Figure 6:
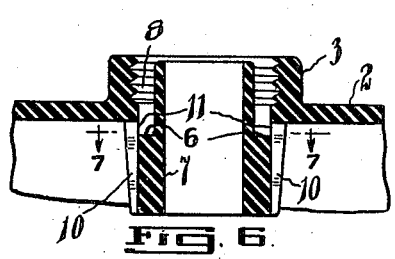
Figure 4:
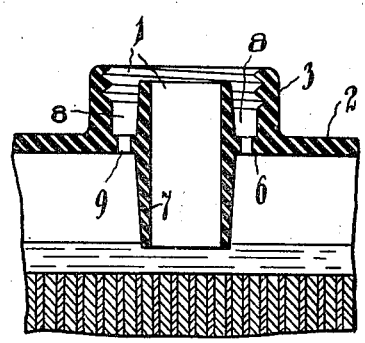

Figure 4 is a fragmentary vertical section on line 4—4 of Figure 3;

Figure 5 is a plan view of an alternative construction of the device with the cap removed;

Figure 6 is a fragmentary vertical section on line 6—6 of Figure 5; and

Figure 7:
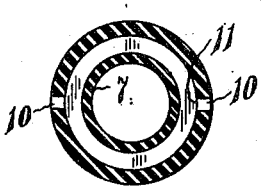

Figure 7 is a horizontal section on line 7—7 of Figure 6.

In the drawings like numerals of reference indicate corresponding parts in the different figures.

The construction of the battery is well known and therefore only such parts as are relative to the present invention are indicated. A filling opening 1 is formed in top 2 of the battery. An upwardly extending boss 3 serving as an outer tube surrounds the filler opening at a short distance therefrom, the boss being internally threaded to receive an externally threaded sealing cap 4, which may be of any suitable construction. Cap 4 is shown in detail in Figures 1 and 2 and has an opening 5 in its top portion adjacent its outer edge.

As previously mentioned an annular shoulder 6 projects from the inner wall of the boss 3 on substantially the same plane as the top 2 of the battery. An inner tube 7, which extends below top 2, is mounted within outer tube 3 by means of the shoulder. The tube 7 may be formed integrally with shoulder 6 as shown or otherwise suitably connected thereto. The inner and outer tubes form an annular passage 8 between each other above top 2, and the shoulder 6 closes the bottom of the annular space to form a well.

Referring to Figures 3 and 4, four vent apertures 9, are formed in annular shoulder 6. In Figures 5 to 7 an alternative construction is shown in which the shoulder 6 is located below top 2. The lower portion of the inner tube 7 is tapered outwardly and is formed or moulded integrally with the underside of the battery top 2. A pair of channels 10, are cut into the outer wall of inner tube 7. The upper ends of the channels form vent apertures 11, in the outer wall of the annular passage opening into annular passage 8 below the battery top 2.

In use the water is poured into annular passage 8 from which it flows into the cell itself through vent apertures 9, or 11. When the level of electrolyte in the cell reaches the lower end of inner tube 7, which is the desired electrolyte level, the pressure of the air trapped in the cell will act as a seal so as to prevent further water from flowing through the apertures. The water will then begin to rise in the annular passage thereby indicating to the operator that the proper electrolyte level has been reached. Moreover as the pressure of air in the cell increases and before sealing of the vent apertures the air will escape from the cell through the water being poured into the annular passage making a bubbling sound which gives an audible indication that the electrolyte in the cell has reached the desired height. If the operator fails to heed these indications and continues to add water it will fill up the annular passage and overflow into inner tube 7 which it will also fill up, thus providing additional indications. The number of holes and the proportions shown in the drawings have been found to be suitable. If the holes are too large, i. e. greater than ⅛ inch, or too numerous the sealing effect will be lost.

Figure 1:
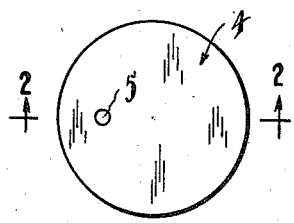
Figure 1 is a plan view showing the cap.
Figure 2:
Figure 2 is a vertical section on line 2—2 of Figure 1.

Referring to Figures 1 and 2, opening 5 is situated in the cap 4 so as to be positioned above annular passage 8 when the cap is threaded into boss or outer tube 3 to seal it after filling. Opening 5 serves to vent the battery to provide for expansion and contraction of the air and electrolyte in the cell. The inner tube 7 results in the inner tube serving as a baffle between the vent opening 5 and the opening in the inner tube 7 so as to prevent the squirting of electrolyte resulting from conventional arrangement. The opening in the inner tube 7 provides means for insertion of the tube of a hydrometer for testing the electrolyte and also for initial filling of the battery.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, a vent aperture communicating between the otherwise closed air space beneath the top of the cell and the well, the aperture being of such size that liquid poured into the well will form a seal over the aperture when the electrolyte in the cell closes the bottom of the inner tube, and a removable cap adapted to be mounted on the outer filling opening to cover the outer open ends of the outer and inner tubes.

2. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, a plurality of vent apertures communicating between the otherwise closed air space beneath the top of the cell and the well, the apertures being of such size that liquid poured into the well will form a seal over the aperture when the electrolyte in the well closes the bottom of the inner tube, and a removable cap adapted to be mounted on the outer filling opening to cover the outer open ends of the outer and inner tubes.

3. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, a plurality of vent apertures extending through the shoulder and communicating between the otherwise closed air space beneath the top of the cell and the well, the apertures being of such size that liquid poured into the well will form a seal over the apertures when the electrolyte in the cell closes the bottom of the inner tube, and a removable cap adapted to be mounted on the outer filling opening to cover the outer open ends of the outer and inner tubes.

4. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, and a channel formed in the outer wall of the inner tube below the top of the cell and extending through the outer wall of the annular passage to form a vent aperture communicating between the otherwise closed air space beneath the top of the cell and the well, the aperture being of such size that liquid poured into the well will form a seal over the aperture when the electrolyte in the cell closes the bottom of the inner tube.

5. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, and a plurality of channels formed in the outer wall of the inner tube below the top of the cell and extending through the outer wall of the annular passage to form vent apertures communicating between the otherwise closed air space beneath the top of the cell and the well, the apertures being of such size that liquid poured into the well will form a seal over the apertures when the electrolyte in the cell closes the bottom of the inner tube.

6. In an electrolyte level control device for storage batteries, a cell having a filling opening in the top thereof, an outer filling tube mounted in the top of the cell around the filling opening and open at its upper end, an inner tube of smaller diameter than the outer tube open at both ends and adapted to provide an opening for initial filling of the battery and insertion of a hydrometer tube for testing said inner tube, being spaced from the outer tube so as to form an annular passage between it and the outer tube, said inner tube extending into the cell below the top thereof to form a closed air space beneath the top of the cell, a shoulder extending between the outer tube and the inner tube below the top of the latter to provide a bottom for the annular space and form a well, a vent aperture communicating between the otherwise closed air space beneath the top of the cell and the well, the aperture being of such size that liquid poured into the well will form a seal over the aperture when the electrolyte in the cell closes the bottom of the inner tube, and a removable cap adapted to close the top of the outer tube, the cap having a vent opening therein adjacent its outer edge adapted to be positioned above the well on mounting the cap whereby the inner tube serves as a baffle between the vent opening and the opening through the inner tube.

JULIUS SANDUSKY.

REFERENCES CITED

The following references are of record in the file of this patent:

UNITED STATES PATENTS

| Number | Name | Date |
| --- | --- | --- |
| 1,878,223 | Woodbridge | Sept. 20, 1932 |
| 1,996,292 | Harding et al. | Apr. 2, 1935 |